(12) United States Patent
Matsubara et al.

(10) Patent No.: US 6,324,029 B1
(45) Date of Patent: Nov. 27, 2001

(54) METHOD AND SYSTEM FOR GMR SENSOR RESET PULSE APPLICATION

(75) Inventors: Nobuya Matsubara, Fujisawa; Masashi Murai, Yamato, both of (JP); Steven Kelly Provazek; Kevin Roy Vannorsdel, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,157

(22) Filed: Jun. 29, 1998

(51) Int. Cl.[7] .................................................. G11B 21/02
(52) U.S. Cl. ............................. 360/75; 360/66; 360/324; 324/252
(58) Field of Search .................. 360/75, 66, 313, 360/324, 324.11, 324.12; 324/252

(56) References Cited

U.S. PATENT DOCUMENTS

| | | |
|---|---|---|
| 4,881,143 | 11/1989 | Bhattacharyya et al. . |
| 5,027,243 | 6/1991 | Gill et al. . |
| 5,189,566 | * 2/1993 | Christensen et al. ................... 360/53 |
| 5,412,518 | 5/1995 | Christner et al. . |
| 5,523,898 | 6/1996 | Jove et al. . |
| 5,561,368 | 10/1996 | Dovek et al. . |
| 5,650,887 | 7/1997 | Dovek et al. . |
| 5,661,614 | 8/1997 | Wallash et al. . |
| 5,664,319 | 9/1997 | Abboud et al. . |
| 5,719,719 | 2/1998 | Tsuyoshi et al. . |
| 5,969,523 | * 10/1999 | Chung et al. ......................... 324/252 |

FOREIGN PATENT DOCUMENTS

WO96/38740    12/1996   (WO) .

* cited by examiner

Primary Examiner—Regina Y. Neal
(74) Attorney, Agent, or Firm—Noreen A. Krall; Bracewell & Patterson, L.L.P.

(57) ABSTRACT

A method and system are disclosed for controlling the application of a reset voltage pulse to a GMR sensor in a direct-access storage device (DASD), such that existing data is not damaged or altered. Each sensor is positioned or parked at a location reserved for reset pulse application, where no valid data is stored. A complex interrelated set of commands is then initiated, and upon completion of the entire set of interrelated commands, a reset pulse is applied to the GMR sensor. Any variation or interruption in the complex interrelated set of commands will result in a disarming of the reset pulse circuitry, effectively preventing an accidental or inadvertent application of the GMR reset pulse. Alternately, a group of GMR sensors each may be tracked to a reserve track, forming a reserve cylinder. Servo marks on the reserve track are sensed by a selected sensor and utilized to ensure no valid data is present. An alternate sensor is then temporarily selected, and a reset pulse is applied, timed to avoid occurrence over a servo mark.

10 Claims, 5 Drawing Sheets

METHOD AND SYSTEM FOR GMR SENSOR RESET PULSE APPLICATION

CROSS-REFERENCE TO PRESENT APPLICATION

The present application is related to patent application U.S. Ser. No. 08/970,573, now U.S. Pat. No. 5,969,523, filed Nov. 14, 1997, assigned to the Assignee herein named. The content of the cross-referenced patent application is incorporated herein by reference thereto.

BACKGROUND OF THE INVENTION

1. Technical Field

The present invention relates, in general, to sensors for reading magnetic flux transitions from magnetic media such as magnetic disks and magnetic tapes and, in particular, to methods and systems for resetting a GMR sensor head in particular. Still more particularly, the present invention relates to a method and system for controlling the application of a reset pulse to a GMR sensor such that existing data is not damaged or altered.

2. Description of the Related Art

Magnetic field sensors are in widespread commercial use in applications such as linear and rotary encoders, proximity detectors, speed and position sensors and magnetometers for sensing the earth's magnetic field. One common magnetic field sensor is based upon the Hall effect and is utilized to sense magnetic fields in the range of 100–10,000 Oe. Another common field transducer is the inductive coil which, although inexpensive, is relatively bulky and has poor low-frequency response. More recently, field sensors based upon anisotropic magnetoresistive (AMR) effect have been introduced. These materials show a change in electrical resistance as a function of the external magnetic field. Wheatstone bridge circuits made of AMR materials are used as magnetic field sensors to sense below approximately 50 Oe over a frequency range from DC to at least one megahertz.

A different and more pronounced magnetoresistance, called giant magnetoresistance (GMR), has been observed in a variety of magnetic multilayered structures. The distinguishing feature of GMR is that there are at least two ferromagnetic layers separated by a thin, non-ferromagnetic metal layer. Application of an external magnetic field causes a variation in the relative orientation of magnetizations of the neighboring ferromagnetic layers. This, in turn, causes a change in the spin-dependent scattering of conduction electrons and, thus, in the electrical resistance of the structure.

A particularly useful GMR structure is a sandwich of two essentially uncoupled ferromagnetic layers. The magnetization of one of the ferromagnetic layers is fixed or "pinned" in a particular direction by exchange coupling with an adjacent antiferromagnetic layer, while the magnetization of the other ferromagnetic layer is free to rotate with an externally applied field. This multilayer sandwich is known as a "spin valve" and exhibits a change in resistance that is proportional to the cosine of the angle between the free and pinned layers. This relationship can be exploited to create devices with an inherently linear relationship between the applied magnetic field and output voltage, which are excellent candidates for devices such as magnetic recording heads and bridge sensors.

A GMR head designed for use in a magnetic recording device typically comprises two weakly coupled ferromagnetic layers separated by a non-magnetic metallic spacer layer in which the magnetization of one of the ferromagnetic layers is pinned. The pinning may be achieved by depositing the ferromagnetic layer to be pinned on an antiferromagnetic layer, such as an iron-manganese layer, to create an interfacial exchange coupling between the two layers. The spin structure of the antiferromagnetic layer can be aligned 10 along a desired direction (in the plane of the layer) by heating beyond the blocking temperature of the antiferromagnetic layer and cooling in the presence of a magnetic field with a predetermined direction.

The blocking temperature is the temperature at which exchange anisotropy vanishes because the local anisotropy of the antiferromagnetic layer, which decreases with temperature, has become too small to anchor the antiferromagnetic spins to the crystallographic lattice. The unpinned or free ferromagnetic layer also may have the magnetization of its extensions (those portions of the free layer on either side of the central active sensing region) fixed, but in a direction perpendicular to the magnetization of the pinned layer so that only the magnetization of the central region of the free layer can rotate in the presence of an external field. The magnetization in the free-layer extensions may be fixed by longitudinal hard biasing or exchange coupling to an antiferromagnetic layer. However, if exchange coupling is used, the antiferromagnetic material is different from the antiferromagnetic material used to pin the pinned layer, and is typically nickel-manganese. This resulting structure is called a spin valve MR sensor and is referred to throughout this application as a "GMR" sensor.

In a GMR sensor, only the free ferromagnetic layer is able to rotate in the presence of an external magnetic field. U.S. Pat. No. 5,159,513 assigned to International Business Machines Corporation, the Assignee of the present application, discloses a GMR sensor in which at least one of the ferromagnetic layers is of cobalt or a cobalt alloy, and in which the magnetization of the two ferromagnetic layers are maintained substantially perpendicular to each when an externally applied magnetic field is not present by exchange coupling of the pinned ferromagnetic layer to an antiferromagnetic layer.

U.S. Pat. No. 5,206,590, also assigned to International Business Machines Corporation, discloses a basic GMR sensor wherein the free layer is a continuous film having a central active region and end regions. The end regions of the free layer are exchange biased by exchange coupling to one type of antiferromagnetic material, and the pinned layer is pinned by exchange coupling to a different type of antiferromagnetic material.

GMR sensors are becoming a replacement for conventional MR sensors based upon the AMR effect. Such sensors have special potential for use as an external magnetic field sensor, such as in anti-lock braking systems and as read heads in magnetic recording systems, such as in rigid-disk drives. However, the GMR sensor, which is typically fabricated by depositing an antiferromagnetic layer of Fe—Mn onto the ferromagnetic pinned layer of cobalt or permalloy, suffers from the problem that the range of blocking temperatures for this interface is relatively low, i.e., it extends only from approximately 130° C. to approximately 160° C. These temperatures may be reached by certain thermal effects during operation of a disk drive, such as an increase in the ambient temperature inside the drive; heating of the GMR sensor due to the bias current; and rapid heating of the GMR sensor due to the head carrier contacting asperities on the disk. In addition, during assembly of the disk drive, the GMR sensor can be heated by an electrical current resulting from an electrostatic discharge, often referred to as electrical overstress.

If any of these thermal effects cause the GMR sensor to exceed the antiferromagnetic's blocking temperature, the magnetization of the pinned layer will no longer be pinned in the desired direction. This will lead to a change in the GMR sensor's response to an externally applied magnetic field and, thus, to errors in data read back from a magnetic disk.

The aforementioned cross-referenced co-pending patent application discloses a method and system for re-initializing a stack of GMR heads so that the GMR heads all have the same orientation, thereby precluding the inversion of half of the GMR heads facing oppositely from the rest. While this technique is highly desirable for providing re-initialization of GMR heads at different points during the manufacturing process, a need exists for a method and system which can re-establish a predetermined magnetic orientation of a GMR sensor in a magnetic disk drive storage system while protecting data stored therein during operation of that disk drive system.

SUMMARY OF THE INVENTION

It is therefore one object of the present invention to provide an improved sensor for reading magnetic flux transitions from magnetic media.

It is another object of the present invention to provide a method and system for re-initialization of the magnetic orientation of a GMR sensor in a magnetic disk drive storage system.

It is yet another object of the present invention to provide a method and system for re-establishing a predetermined magnetic orientation of a GMR sensor in a magnetic disk drive storage system while protecting data stored therein.

The foregoing objects are achieved as is now described. A method and system are disclosed for controlling the application of a reset voltage pulse to a GMR sensor in a direct-access storage device (DASD), such that existing data is not damaged or altered. Each sensor is positioned or parked at a location reserved for reset pulse application, where no valid data is stored. A complex interrelated set of commands is then initiated, and upon completion of the entire set of interrelated commands, a reset pulse is applied to the GMR sensor. Any variation or interruption in the complex interrelated set of commands will result in a disarming of the reset pulse circuitry, effectively preventing an accidental or inadvertent application of the GMR reset pulse. Alternately, a group of GMR sensors each may be tracked to a reserve track, forming a reserve cylinder. Servo marks on the reserve track are sensed by a selected sensor and utilized to ensure no valid data is present. An alternate sensor is then temporarily selected, and a reset pulse is applied, timed to avoid occurrence over a servo mark.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives and advantages thereof, will best be understood by reference to the following detailed description of a preferred embodiment when read in conjunction with the accompanying drawings, wherein:

DESCRIPTION OF THE PREFERRED EMBODIMENT

Figure 1:
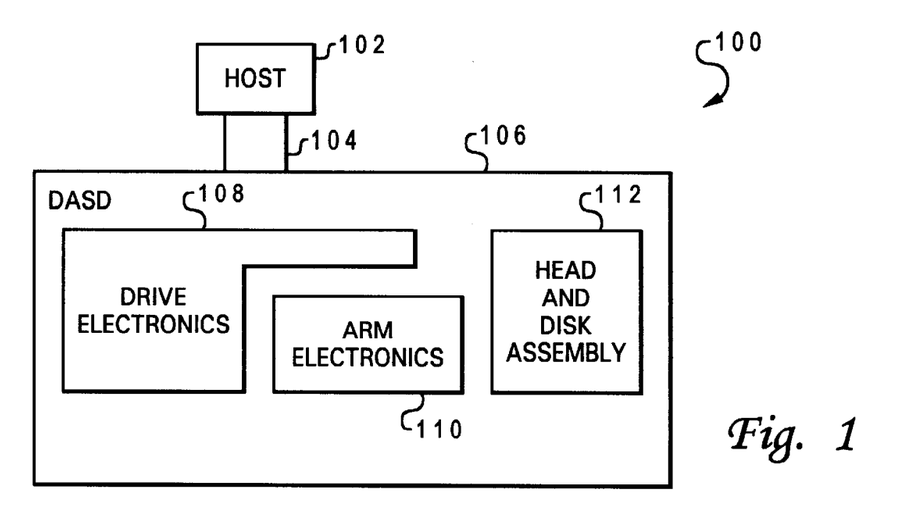
FIG. 1 is a block diagram of a digital data processing system which may be utilized to implement one embodiment of the present invention.

With reference now to the figures and, in particular, with reference to FIG. 1, there is depicted a block diagram of a digital data processing system which may be utilized to implement the method and system of the present invention. As depicted, FIG. 1 generally illustrates the implementation of a digital data processing system 100. System 100 includes a host 102 which is typically a computing system such as an S/390, AS/400 or a similar type well-known to those skilled in the computer arts. Host 102 preferably is coupled to direct-access storage device 106 (DASD) via input/output channel 104. Channel 104 may perform various functions such as coordinating, receiving and sending data and commands to and from host 102, or other typical input/output interface functions well-known in the art.

In the depicted embodiment of the present invention, DASD 106 comprises drive electronics 108, arm electronics 110 and a head and disk assembly 112. Drive electronics 108 interface and cooperate with arm electronics 110 to control the physical movements of the components DASD 106 and the transfer of data and commands to and from the head and disk assembly 112. Head and disk assembly 112 is shown in greater detail in FIG. 2.

Figure 2:
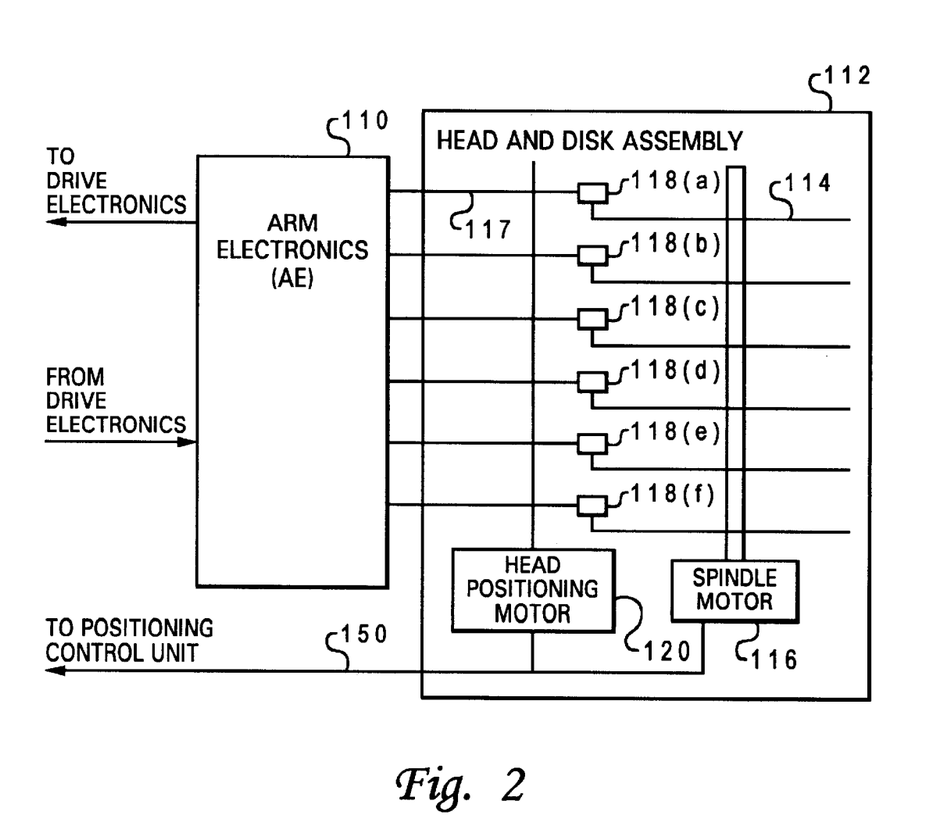
FIG. 2 is a high-level block diagram of the arm electronics and head and disk assembly of the digital data processing system of FIG. 1.

In one embodiment of the present invention, data and commands are sent via arm electronics (AE) 110 which, in turn, communicates with head and disk assembly 112, including multiple GMR sensors 118 (a–f), a head-positioning motor 120, and a spindle motor 116. Each GMR sensor is individually attached to an actuating arm 117, and more than one sensor may be used to read or write to a given disk. In alternate embodiment of the present invention, headpositioning motor 120 and spindle motor 116 may receive information directly from drive electronics 108. In either event, information received by the head and disk assembly is utilized to move an actuating arm having a designated sensor 118 to a position over a storage medium 114. Spindle motor 116 may be engaged to rotate the disk to cooperate in locating the sensor to a desired location.

Figure 3:
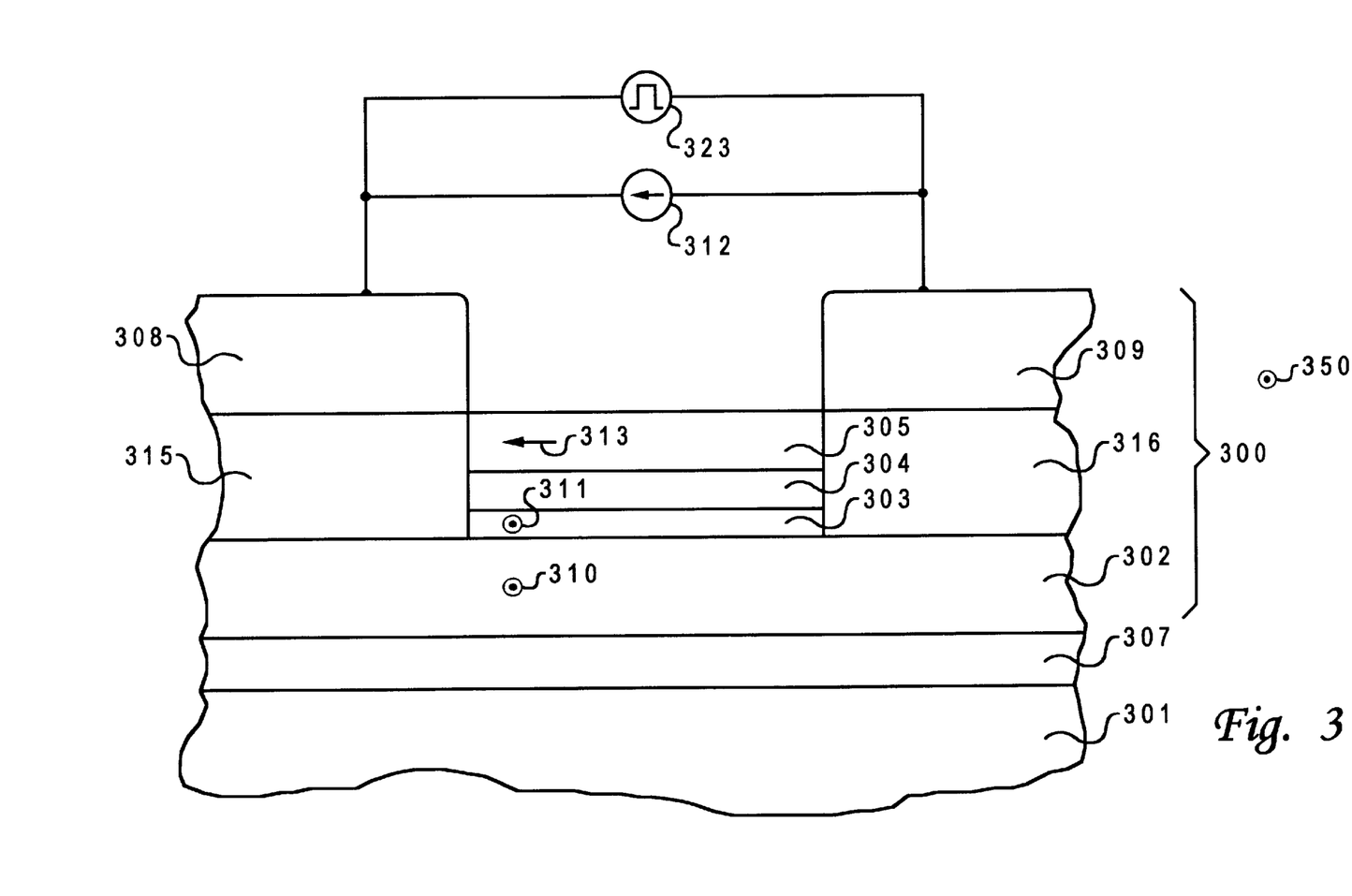
FIG. 3 is a cross-sectional plan view of a GMR sensor which may be utilized to implement the method and system of the present invention.

With reference now to FIG. 3, there is depicted a cross-sectional plan view of a GMR sensor which may be utilized to implement the method and system of the present invention. As illustrated, FIG. 3 depicts a plan view of the air-bearing surface of a substrate 301 containing GMR sensor 300. The substrate's air-bearing surface normally rides on a cushion of air, which separates it from a magnetic data storage medium, such as a disk or tape.

Sensor 300 includes a plurality of substantially parallel layers, including an antiferromagnetic layer 302, a ferromagnetic pin layer 303, a conductive layer 304, and a ferromagnetic free layer 305. Sensor 300 also preferably includes hard biased layer 315 and 316, the operation of which will be discussed in detail herein. Sensor 300 is preferably deposited upon an insulator 107 which lies atop substrate 301. Adjacent layers preferably lie in direct atomic contact with each other.

Antiferromagnetic layer 302 preferably comprises a type and thickness of antiferromagnetic substance suitable for use as a pinned layer in GMR sensors, e.g., a 400 Angstrom layer of NiO. The ferromagnetic pinned layer 303 preferably comprises a type and thickness of ferromagnetic substance suitable for use in GMR sensors, e.g., a 10–40 Angstrom layer of Co. Conductor layer 304 preferably comprises a type and thickness of conductive substance suitable for use in a GMR sensor, such as a 20–30 Angstrom layer of copper. The ferromagnetic free layer 305 preferably comprises a 30–150 Angstrom layer of Ni—Fe. Hard-biased layers 315 and 316 provide the free layer 305 with a desired quiescent magnetization. Hard-biased layers 315 and 316 preferably comprise a magnetic material with a high coercivity, such as CoPtCr.

While the foregoing description of GMR sensor 300 is particularly detailed, those having ordinary skill in the art will appreciate that the method and system of the present invention may be applied to various different sensor arrangements in addition to the present example.

Sensor 300 preferably exhibits a predefined magnetization. Magnetization of sensor 300, including the ferromagnetic layers 303 and 305 and antiferromagnetic layer 302 is generally magnetized, prior to initial operation, during fabrication or assembly. Additionally, sensor 300 may be magnetized after some period of operating sensor 300 if sensor 300 loses its magnetic orientation due to a traumatic high-temperature event, such as electrostatic discharge.

When appropriately magnetized, the magnetized components of sensor 300 are given an identical magnetic configuration. In particular, antiferromagnetic layer 302 has a magnetic orientation in a direction indicated at reference numeral 310. For ease of explanation, conventional directional shorthand is utilized in the present description wherein an encircled dot indicates a direction coming out of the page, and an encircled x indicates a direction going into a page. Neighboring ferromagnetic pinned layer 303 has a magnetic moment pinned in a parallel direction 311 due to antiferromagnetic exchange coupling between layers 302 and 303.

Unlike the pinned layer 303, free layer 305 has a magnetic moment that freely responds to external magnetic fields, such as those present in a magnetic storage medium. Free layer 305 responds to an external magnetic field by changing its magnetic moment, which in turn changes the resistance of GMR sensor 300. In the absence of any other magnetic fields, free layer 305 orients itself in a direction 313, which is oriented 90° to the directions indicated at reference numerals 310 and 311. This quiescent magnetization direction is due to biasing of free layer 305 by hard biased layers 315 and 316.

GMR sensor 300 also may include various accessories to direct electrical current and magnetic fields through GMR sensor 300. A small but constant sense current, for example, is preferably directed through GMR sensor 300 to provide a source of scattering electrons for operation of GMR sensor 300 according to the GMR effect. At different times, a relatively large current pulse or waveform may be directed through GMR sensor 300 to establish the magnetization direction of GMR sensor 300 in accordance with the method and system of the present invention.

Still referring to FIG. 3, GMR sensor 300 is preferably attached to a pair of complimentary conductive leads 308 and 309 in order to facilitate electrical connection to a sense current source 312. Conductive leads 308 and 309 also facilitate electrical connection to a pulse current source 323. Conductive leads 308 and 309 preferably comprise a 500 Angstrom layer of Ta with a 50 Angstrom underlayer of Cr, or other suitable thickness and type of conductive material. The attachment of leads to magnetoresistive sensors is a well-known technique familiar to those having ordinary skill in the art and will not be discussed herein.

A reset pulse which may be applied to GMR sensor 300 in order to re-establish a predetermined magnetic orientation thereof is typically comprised of an electrical current pulse utilized to heat the antiferromagnetic layer beyond its blocking temperature and a magnetic field which is simultaneously applied in order to orient the antiferromagnetic layer in accordance with the well-known right-hand rule of electromagnetics. The pulse of current preferably lasts sufficiently long to remove any magnetic orientation of the antiferromagnetic layer and also to reorient the layers in accordance with the magnetic field created by the flowing current. This reset pulse has the effect of pinning the magnetization directions of the ferromagnetic pinned layer 303. This will occur as a result of the strong exchange coupling between the antiferromagnetic-ferromagnetic pair 302 and 303.

Upon reference to the foregoing, those skilled in the art will appreciate that it is imperative that a reset pulse not be applied to a GMR sensor while the GMR sensor is proximate to valid customer data. Further, as the reset pulse voltage typically applied to raise the heat of the GMR sensor is generally close to the damage point of a GMR sensor, a reset pulse must never be inadvertently applied. Consequently, a method and system are required for re-establishing a pre-determined a magnetic orientation of a GMR sensor in a magnetic disk drive storage system while protecting the data stored therein.

Figure 4:
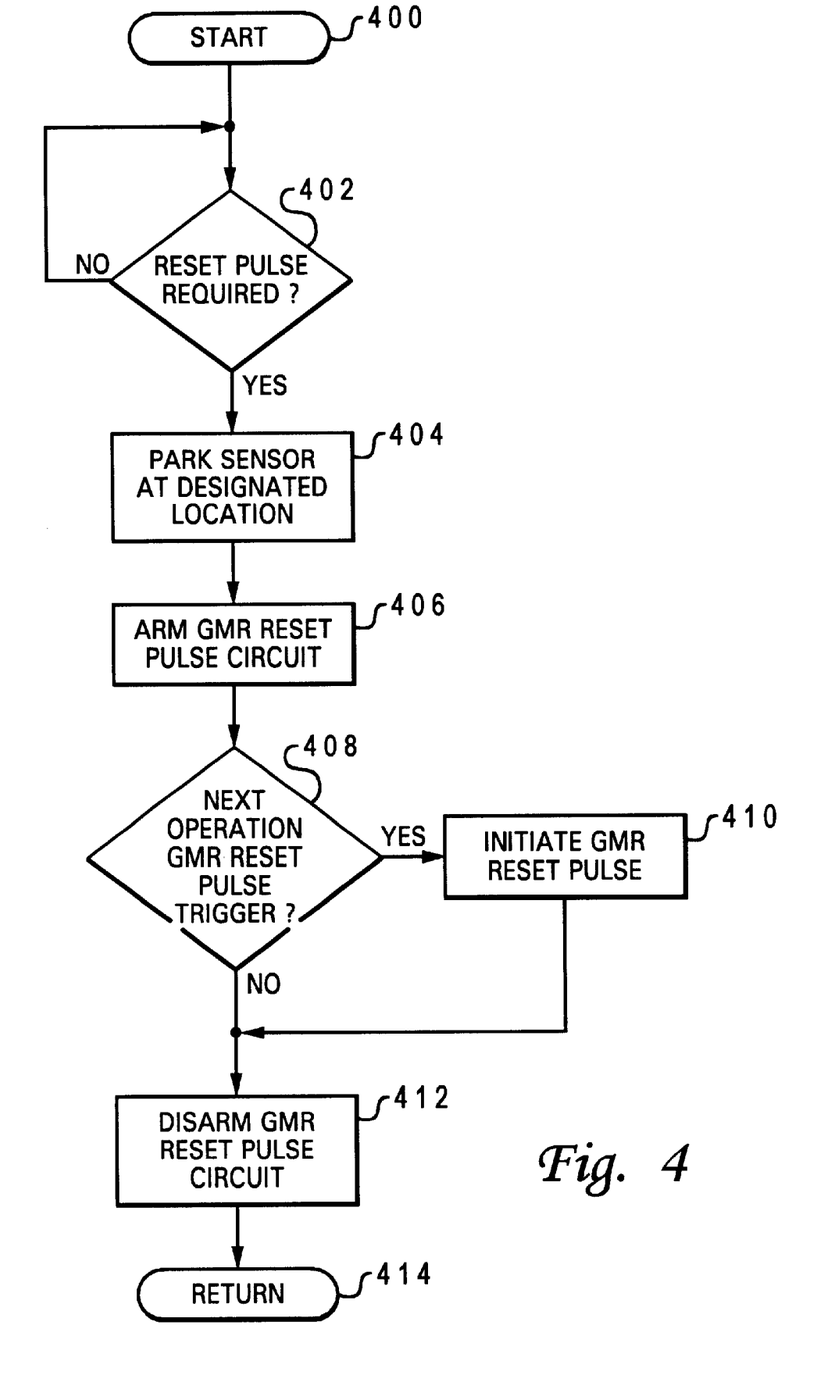
FIG. 4 is a high-level logic flow chart illustrating an asynchronous command-driven reset control function in accordance with one embodiment of the present invention.

Referring now to FIG. 4, there is depicted a high-level logic flow chart illustrating an asynchronous command-driven reset control function in accordance with one embodiment of the present invention. As depicted, this process begins at block 400 and thereafter passes to block 402. Block 402 illustrates a determination of whether or not a reset pulse is required. Such a determination may be made as a result of erroneous data readings or, periodically, in accordance with a set maintenance schedule. In the event a reset pulse is not required, the process merely iterates until such time as a reset pulse may be required.

Referring now to block 404, in the event a reset pulse is required, the sensor is parked or placed at a designated location wherein no valid customer data is located. The magnitude of the reset pulse is such that valid customer data may be corrupted by the application of a reset pulse while the sensor is located proximate to stored data.

Next, the application of a GMR reset pulse will be described. As illustrated herein, an asynchronous GMR reset pulse sequence must consist of a complex, interrelated set of three serial port operations performed in a specified order. The first operation is the arming of the GMR reset pulse circuit. In addition to the appropriate serial port settings for initiating the arming of a GMR reset pulse circuit, a valid head address must be selected. A valid head address comprises a head address which identifies an actual head within the system. After meeting all of these conditions, armed electronics 110 (see FIG. 2) will enter a mode in which the GMR reset pulse circuit is armed.

Next, the process passes to block 408. Block 408 illustrates a determination of whether or not the next operation which occurs is a GMR reset pulse trigger. If so, the process passes to block 410 which initiates the GMR reset pulse.

Referring again to block 408, in the event the next operation is not a GMR reset pulse trigger, or an operation not inconsistent with GMR reset, such as, for example, a VIEW OPERATION, the process passes to block 412. Block 412 illustrates the immediate disarming of the GMR reset pulse circuit.

Referring back to block 410, after initiation of the GMR reset pulse, the process also passes to block 412 which depicts the disarming of the GMR reset pulse circuit. In either event, the process then passes to block 414 and returns.

As illustrated within FIG. 4, it should be noted that the asynchronous command-driven reset control function described therein allows the user to apply a GMR reset pulse whenever the head is not flying over valid data, is parked distant from valid data and when the pulse does not need to be applied synchronously consistent with the revolution of the magnetic disk.

Figure 5A:
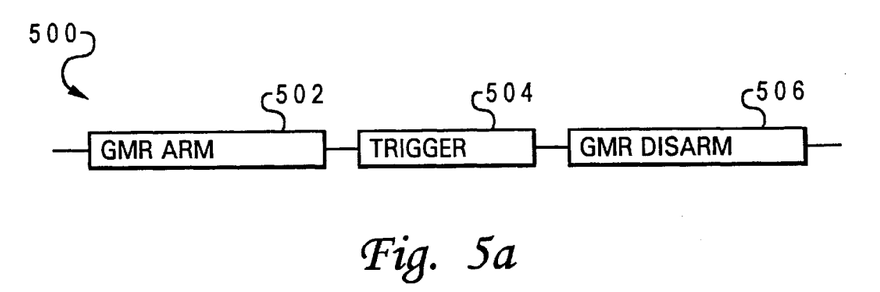
FIGS. 5a and 5b are timing diagrams illustrating the timing of the asynchronous command-driven reset control function depicted in FIG. 4.
Figure 5B:
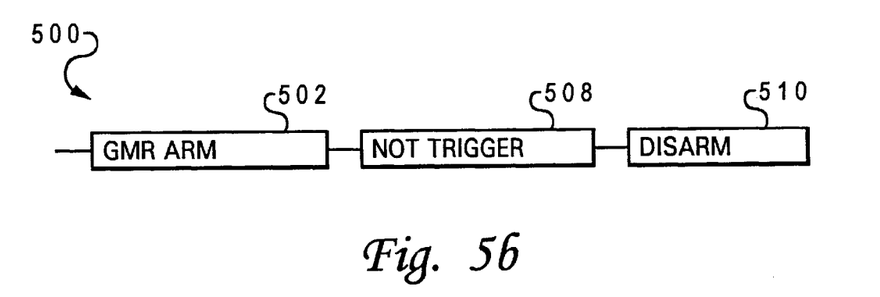

With reference now to FIGS. 5a and 5b, a series of timing diagrams are depicted illustrating the timing of the asynchronous command-driven reset control function described above.

As depicted in FIG. 5a, at reference numeral 500, a series of serial port commands and conditions must be met in order to enter the armed GMR reset mode. At reference numeral 502, the armed mode is initiated. Thereafter, as depicted in FIG. 5a, a trigger signal is applied and the GMR reset pulse occurs as indicated at reference numeral 504. Thereafter, upon successful application of the GMR reset pulse, the system disarms the GMR reset pulse circuit as depicted at reference numeral 506.

Alternately, as depicted in FIG. 5b, in the event the system arms the GMR reset pulse circuit, as depicted at reference numeral 500, and the circuit becomes armed at reference numeral 502, safety procedures are present to ensure that the reset pulse is not erroneously or inadvertently applied. In the event an operation which is not a trigger signal occurs, as depicted at reference numeral 508, the system immediately disarms the GMR reset pulse circuit, as depicted at reference numeral 510. Of course, as described above, selected operations which do not result in the reading or writing of data such as a VIEW OPERATION may be interposed between the three required serial port operations necessary to apply a reset pulse to a GMR sensor.

Figure 6:
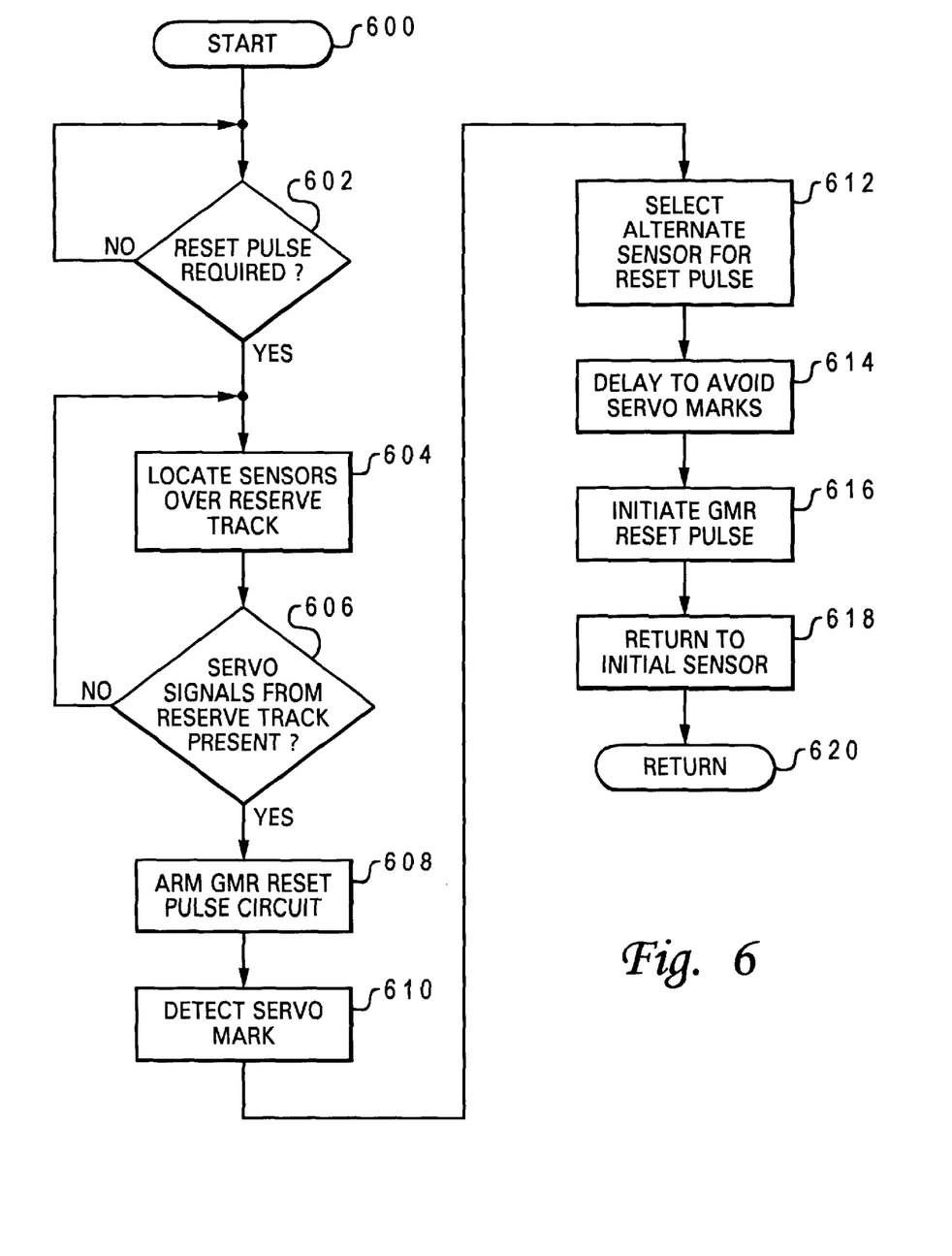
FIG. 6 is a high-level logic flow chart illustrating a synchronous "flying" reset control function in accordance with a second embodiment of the present invention.

Referring now to FIG. 6, there is depicted a high-level logic flow chart which illustrates a synchronous "flying" reset control function in accordance with a second embodiment of the present invention. In this embodiment, a reset pulse is applied to a GMR sensor while the actuator is track-following, and synchronization must be achieved between the application of the reset pulse and the position of the GMR sensor with respect to the track in order to avoid corrupting data or servo marks recorded within the track.

As depicted, the process begins at block 600 and thereafter passes to block 602. As noted above, block 602 illustrates a determination of whether or not a reset pulse is required. If not, as described above, the process merely iterates until such time as a reset pulse is required.

Next, in the event a reset pulse is required, the process passes to block 604 which depicts the locating of the sensors over a reserve track forming a portion of a reserve cylinder within the multiple disks within head and disk assembly 112 (see FIG. 2) utilizing a sensor which operates correctly. Next, the process passes to block 606. Block 606 illustrates the presence of servo signals from the reserve track, indicating that the sensors are accurately tracking over the reserve track and, consequently, are not proximate to valid data which might be corrupted by the presence of a GMR reset pulse. In the event servo signals from the reserve track are not present, the process merely iterates until such time as the sensors are accurately flying over each reserve track.

Once servo signals are present from the reserve track, the process passes to block 608. Block 608 illustrates the arming of the GMR reset pulse circuit, as described above. Next, the process passes to block 610. Block 610 illustrates the detection of an individual servo mark from the reserve track and the process then passes to block 612.

Block 612 depicts the temporary selection of an alternate sensor which requires the application of a GMR reset pulse. A short delay, typically 20 nanoseconds, then is encountered, as depicted in block 614, to permit completion of selection of the alternate sensor and, as depicted in block 616, the GMR reset pulse is initiated. Thereafter, as depicted at block 618, the initial sensor is selected once again, and the process passes to block 620 and returns.

Figure 7:
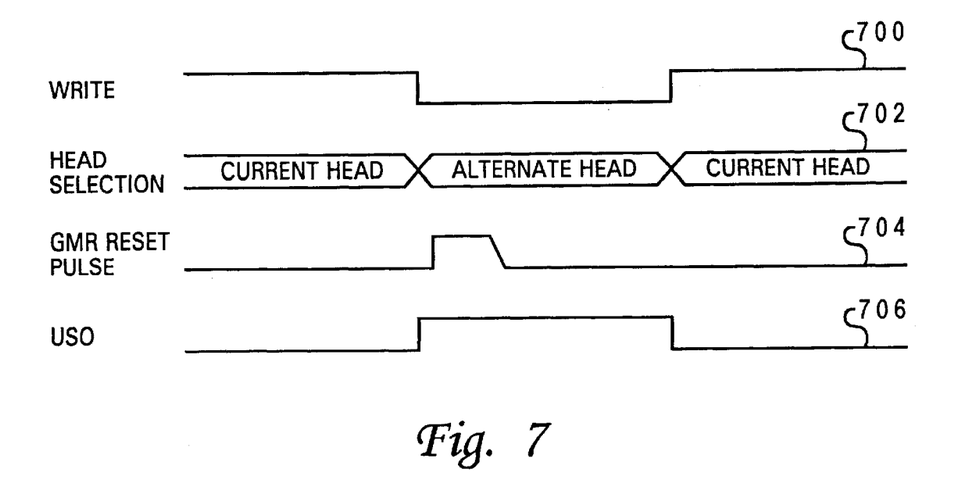
FIG. 7 is a timing diagram illustrating the synchronous "flying" reset control function of the present invention.

Finally, with reference to FIG. 7, there is depicted a timing diagram which illustrates the synchronous "flying" reset control function described above. As depicted at reference numeral 700, the write mode is deactivated during the application of the GMR reset pulse. Thereafter, as depicted at block 702, the selection of an alternate head from the current head occurs after servo tracking ensures that the GMR sensors are flying over the reserve track. Next, after a nominal delay of 20 nanoseconds following detection of a servo mark in order to ensure that the reset pulse does not corrupt servo marks within the reserve track, a GMR reset pulse is applied, as depicted at block 704. Finally, an unsafe operation (USO) signal is posted during application of a GMR reset pulse as depicted at reference numeral 706.

Upon reference to the foregoing, those skilled in the art will appreciate that the Applicants herein named have devised a method and system whereby a GMR reset pulse may be applied to a GMR sensor within a magnetic disk drive storage system while protecting the data stored therein by applying the GMR reset pulse after positioning the GMR sensor distant from data stored therein and after successful completion of a complex, interrelated set of commands such that inadvertent or erroneous application of the reset pulse is avoided. Alternately, a GMR reset pulse may be applied while the sensors are tracking over a reserve track by rapidly switching from a sensor utilized to detect servo marks within the reserve track to the sensor which requires the application of a reset pulse in synchronicity with the rotation of the disk.

While an illustrative embodiment has been particularly shown and described, it will be understood by those skilled in the art that various changes in form and detail may be made therein without departing from the spirit and scope of the illustrative embodiment.

What is claimed is:

1. A method for re-establishing a predetermined magnetic orientation of a GMR sensor in a magnetic disk drive storage system while protecting data stored therein, said method comprising the steps of:

positioning said GMR sensor distant from data stored within said magnetic disk drive storage system;

temporarily arming a reset pulse circuit within said magnetic disk drive storage system;

activating a reset pulse only in response to a trigger signal following said arming;

disarming said reset pulse circuit within said magnetic disk drive storage system following said activating of said reset pulse; and immediately disarming said reset pulse circuit within said magnetic disk drive storage system in response to an occurrence of either a read-or-write operation within said magnetic disk drive storage system following said arming and prior to an occurrence of said trigger signal such that a reset pulse cannot be improperly initiated.

2. The method for re-establishing a predetermined magnetic orientation of a GMR sensor in a magnetic disk drive storage system while protecting data stored therein, according to claim 1, wherein said step of positioning said GMR sensor distant from data stored within said magnetic disk drive storage system further comprises the step of parking said GMR sensor at a location where no data is stored within said magnetic disk drive storage system.

3. The method for re-establishing a predetermined magnetic orientation of a GMR sensor in a magnetic disk drive storage system while protecting data stored therein, according to claim 1, wherein said step of temporarily arming a reset pulse circuit within said magnetic disk drive storage system further comprises the step of temporarily arming a reset pulse circuit within said magnetic disk drive storage system only in response to the presence of a valid address for said GMR sensor.

4. A method for re-establishing a predetermined magnetic orientation of a first GMR sensor among a plurality of GMR sensors in a magnetic disk drive storage system while protecting data stored therein, said method comprising the steps of:

tracking a second GMR sensor over a reserved track within said magnetic disk drive storage system;

temporarily arming a reset pulse circuit within said magnetic disk drive storage system;

sensing a servo-positioning mark utilizing said second GMR sensor;

temporarily switching to said first GMR sensor;

coupling a reset pulse to said first GMR sensor; and reselecting said second GMR sensor.

5. The method for re-establishing a predetermined magnetic orientation of a first GMR sensor among a plurality of GMR sensors in a magnetic disk drive storage system while protecting data stored therein, according to claim 4, wherein said step of coupling a reset pulse to said first GMR sensor comprises the step of coupling a reset pulse to said first GMR sensor following a specified delay period.

6. A system for re-establishing a predetermined magnetic orientation of a GMR sensor in a magnetic disk drive storage system while protecting data stored therein, said system comprising:

means for positioning said GMR sensor distant from data stored within said magnetic disk drive storage system;

means for temporarily arming a reset pulse circuit within said magnetic disk drive storage system;

means for activating a reset pulse only in response to a trigger signal following said arming;

means for disarming said reset pulse circuit within said magnetic disk drive storage system following said activating of said reset pulse; and means for immediately disarming said reset pulse circuit within said magnetic disk drive storage system in response to an occurrence of either a read-or-write operation within said magnetic disk drive storage system following said arming and prior to an occurrence of said trigger signal such that a reset pulse cannot be improperly initiated.

7. The system for re-establishing a predetermined magnetic orientation of a GMR sensor in a magnetic disk drive storage system while protecting data stored therein, according to claim 6, wherein said means for positioning said GMR sensor distant from data stored within said magnetic disk drive storage system further comprises means for parking said GMR sensor at a location where no data is stored within said magnetic disk drive storage system.

8. The system for re-establishing a predetermined magnetic orientation of a GMR sensor in a magnetic disk drive storage system while protecting data stored therein, according to claim 6, wherein said means for temporarily arming a reset pulse circuit within said magnetic disk drive storage system further comprises the means for temporarily arming a reset pulse circuit within said magnetic disk drive storage system only in response to the presence of a valid address for said GMR sensor.

9. A system for re-establishing a predetermined magnetic orientation of a first GMR sensor among a plurality of GMR sensors in a magnetic disk drive storage system while protecting data stored therein, said system comprising:

means for tracking a second GMR sensor over a reserved track within said magnetic disk drive storage system;

means for temporarily arming a reset pulse circuit within said magnetic disk drive storage system;

means for sensing a servo-positioning mark utilizing said second GMR sensor;

means for temporarily switching to said first GMR sensor;

means for coupling a reset pulse to said first GMR sensor; and means for reselecting said second GMR sensor.

10. The system for re-establishing a predetermined magnetic orientation of a first GMR sensor among a plurality of GMR sensors in a magnetic disk drive storage system while protecting data stored therein, according to claim 9, wherein said means for coupling a reset pulse to said first GMR sensor comprises the means for coupling a reset pulse to said first GMR sensor following a specified delay period.

* * * * *